United States Patent
Chud et al.

(10) Patent No.: US 10,931,673 B2
(45) Date of Patent: Feb. 23, 2021

(54) POLICY ACTIVATION FOR CLIENT APPLICATIONS

(71) Applicant: Amazon Technologies, Inc., Seattle, WA (US)

(72) Inventors: Andrew Christopher Chud, Seattle, WA (US); Adrian Edward Hall, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 177 days.

(21) Appl. No.: 15/709,218

(22) Filed: Sep. 19, 2017

(65) Prior Publication Data
US 2019/0089705 A1    Mar. 21, 2019

(51) Int. Cl.
*H04L 29/06* (2006.01)
*G06F 21/30* (2013.01)
*H04L 9/32* (2006.01)
*H04L 9/08* (2006.01)

(52) U.S. Cl.
CPC ............. *H04L 63/10* (2013.01); *G06F 21/30* (2013.01); *H04L 63/08* (2013.01); *H04L 63/102* (2013.01); *H04L 63/20* (2013.01); *H04L 9/08* (2013.01); *H04L 9/3247* (2013.01); *H04L 9/3263* (2013.01); *H04L 63/045* (2013.01)

(58) Field of Classification Search
CPC ....... H04L 63/10; H04L 63/102; H04L 63/08; H04L 63/20; H04L 9/08; G06F 21/30
See application file for complete search history.

(56) References Cited

U.S. PATENT DOCUMENTS

| | | | |
|---|---|---|---|
| 9,557,889 B2 * | 1/2017 | Raleigh | H04M 15/44 |
| 9,613,352 B1 * | 4/2017 | Leoutsarakos | G06Q 20/3274 |
| 2013/0091171 A1 | 4/2013 | Lee | |

(Continued)

OTHER PUBLICATIONS

Bartolomeo et al., "User Profile Management in Next Generation Networks," 2009 Fifth Advanced International Conference on Telecommunications Year: 2009 | Conference Paper | Publisher: IEEE.*

(Continued)

*Primary Examiner* — Roderick Tolentino
(74) *Attorney, Agent, or Firm* — Davis Wright Tremaine LLP

(57) ABSTRACT

A policy management service receives a request from an application to access another service. The request identifies a desired access control policy and/or policy-related permissions associated with access to the service. The policy management service generates a record associated with the request, and provides, to an authenticating entity, an activation code that corresponds to the record. The policy management service validates the activation code and the authenticating entity and enables the authenticating entity to review the record to determine whether to approve creation of the principal and attachment of the desired permissions and/or access control policy to the principal. If approved, the policy management service creates the principal and attaches the desired permissions and/or the access control policy to the principal. The policy management service provides the information associated with the principal to the application to enable access by the application to the service.

20 Claims, 10 Drawing Sheets

(56) References Cited

U.S. PATENT DOCUMENTS

| | | | |
|---|---|---|---|
| 2013/0191882 A1* | 7/2013 | Jolfaei | H04L 63/10 726/4 |
| 2014/0189799 A1* | 7/2014 | Lu | H04L 63/08 726/4 |
| 2014/0245396 A1* | 8/2014 | Oberheide | H04L 63/18 726/4 |
| 2015/0334105 A1* | 11/2015 | Kessler | H04L 67/025 726/5 |
| 2016/0028737 A1* | 1/2016 | Srinivasan | H04L 63/0807 726/1 |
| 2017/0078272 A1 | 3/2017 | Guionneau | |
| 2017/0201850 A1* | 7/2017 | Raleigh | G06F 3/0482 |
| 2017/0237744 A1* | 8/2017 | Chae | G06F 3/0488 726/7 |
| 2019/0057385 A1* | 2/2019 | Nair | H04L 63/102 |

OTHER PUBLICATIONS

Dennis et al., "Data mining approach for user profile generation on advertisement serving," 2016 8th International Conference on Information Technology and Electrical Engineering (ICITEE) Year: 2016 | Conference Paper | Publisher: IEEE.*

International Search Report and Written Opinion, dated Nov. 21, 2018, International Patent Application No. PCT/US2018/051202, filed Sep. 14, 2018, 15 pages.

* cited by examiner

POLICY ACTIVATION FOR CLIENT APPLICATIONS

BACKGROUND

Customers and other users of a computing resource service provider often configure external client applications that leverage resources provided by the computing resource service provider. However, generating policies that are used to authorize the client applications to leverage these resources is error prone and difficult. Further, if a customer or other user utilizes an external client application to access the computing resource service provider to configure use of resources provided by the computing resource service provider, it is often difficult to authenticate the external client application for enabling generation of the policies required to enable the external client application to access the necessary resources.

BRIEF DESCRIPTION OF THE DRAWINGS

Various techniques will be described with reference to the drawings, in which.

DETAILED DESCRIPTION

Figure 1:
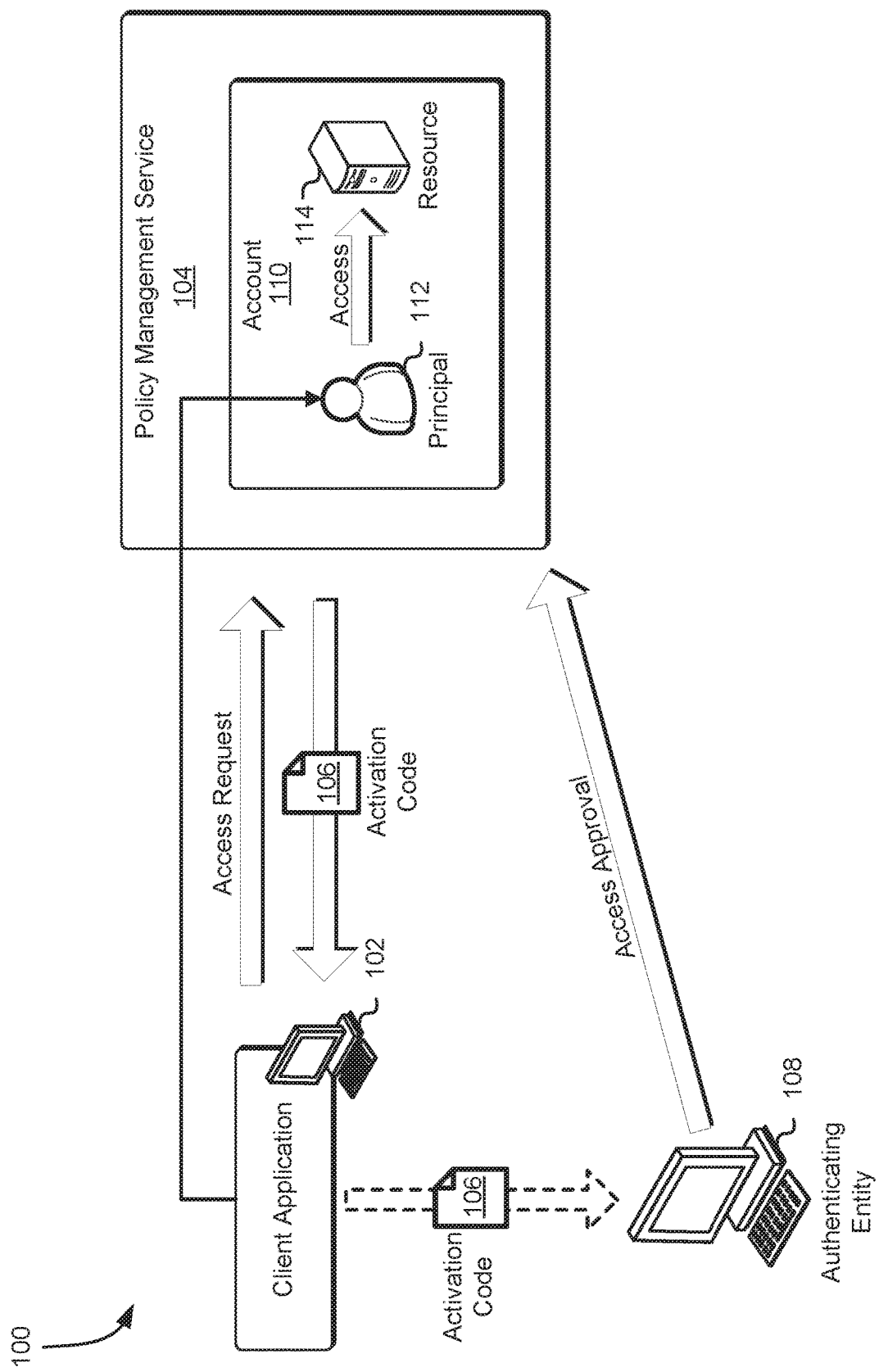
FIG. 1 shows an illustrative example of a system in which access by a client application to one or more services is enabled using functionality, such as activation code generation and processing, associated with a policy management service, in accordance with an embodiment.

Techniques described and suggested herein relate to activating a set of policies within a computing resource service provider for a client application to enable the client application to leverage resources provided by the computing resource service provider. In an embodiment, a client application or other system external to the computing resource service provider transmits a request to a policy management service of the computing resource service provider to obtain an activation code. The request, in an embodiment, is transmitted without the client application or other system being authenticated by the policy management service. The request specifies the name of a principal, policies that are to be attached to the principal, and additional identifying information about the client application or other system. In an embodiment, the policy management service stores a record corresponding to the request and starts an expiration time period for the record. The policy management service transmits the activation code and a Uniform Resource Identifier (URI) for an interface where the activation code can be submitted.

In an embodiment, the user receiving the activation and URI accesses the policy management service using the provided URI. The user provides its authentication information to the policy management service, which determines whether the user is authenticated. If the user is authenticated, the policy management service updates an interface used by the user to request the activation code. Through the interface, the user inputs the activation code and provides it to the policy management service. In an embodiment, the policy management service determines whether the activation code is valid and, if so, obtains the corresponding record. The policy management service updates the interface to present the record corresponding to the provided activation code and prompts the user to either approve the request from the client application or to deny the request. In an embodiment, the policy management service updates the interface to provide the user with the identifying information for the client application, as well as the applicable policies and the principal that is to be created upon approval.

If the user approves the request from the client application, the policy management service creates the principal and attaches the applicable policies to the principal. In an embodiment, the policy management service obtains an access key identifier and stores this identifier along with secret access key values in the record with the activation code. In one embodiment, the client application polls services provided by the computing resource service provider by submitting the activation code. If the record is updated to include the access key identifier and the secret access key values, the client application receives a successful response with the access key identifier and a secret access key. The client application installs these keys onto the physical host or to another service or resource accessible by the client application. The access key identifier and the secret access key are used by the client application to access resources provided by the computing resource service provider in accordance with the applicable policies attached to the created principal.

In this manner, a user approves permissions that are applicable to a particular application without need to select these permissions or create a principal to which these permissions are attached. In addition, the techniques described and suggested herein facilitate additional technical advantages. For example, because the user is authorized to determine whether to approve or deny attachment of policies to a principal identified by a client application, the user can prevent fraudulent access to resources. In an embodiment, if the user denies permission to grant the request by the client application, the policy management service transmits a response indicating that the request has been denied. Further, the policy management service adds the client application to a blacklist. In an embodiment, membership in the blacklist expires automatically after a period of time has elapsed (e.g., an hour, a day, a week, etc.). In an embodiment, the policy management service transmits a notification to the user to enable the user to indicate whether or not to block all subsequent requests from the client application. Thus, the client application is blocked from accessing the policy management service and other resources while it is in the blacklist. Further, if the user does not provide its activation code within the expiration time period, the activation code record expires and is removed. This prevents the activation code from being used at a later time.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in accordance with an embodiment. In the system 100, a client application 102 transmits a request to a policy management service 104 to access one or more resources 114 provided by a computing resource service and associated with a particular account 110. The client application 102 is, in an embodiment, an application installed on a computing device that enables users (e.g., developers, programmers, customers of a service, etc.) to connect to a remote service to access one or more resources 114 provided by this remote service. In an embodiment, in order to enable the client application 102 to access to the one or more resources 114 provided by this remote service, the client application 102 transmits an access request to a policy management service 104 to associate one or more access control policies with a user 112 (also referred to herein as a "principal") in an account 110 that corresponds to a customer of the remote service. The request, in an embodiment, specifies that a principal 112 is to be created within the account 110 and the particular resources to which the client application 102 requires access. Based at least in part on this information specified within the request, the policy management service 104 identifies one or more applicable access control policies to be associated with the principal 112 to enable the client application 102 to access the one or more resources 114. In an embodiment, the request from the client application 102 to the policy management service 104 is unauthenticated (e.g., no credential information is supplied and no authentication is performed for the client application 102).

These access control policies, in an embodiment, are collections of permissions associated with a user, a group, a role, an organization, a company, or some other such entity. Each permission, in an embodiment, is associated with a computing resource 114 and specifies whether the entity (also referred to herein as a "principal") is authorized to access that resource 114, under what conditions access is allowed or denied, and/or what type of access is allowed or denied. In an embodiment, a permission specifies that a user named "USER1" is authorized to access a certain data storage device denoted by identifier "12345." A more detailed permission can specify that USER1 is authorized to only read from resource 12345, but is not authorized to write to resource 12345. A still more detailed permission can specify that USER1 is authorized to read from resource 12345 at any time, but is only authorized to write to resource 12345 between the hours of 9:00 and 9:30 AM. Permissions, in an embodiment, are also associated with classes or collections of resources so that, for example, USER1 has access to a collection of data storage devices, one of which is resource 12345. Principals, in an embodiment, include individual users, accounts, computing resource services, or other principal entities that are allowed or denied access to a computing resource.

Computing resource policies, in an embodiment, are maintained by a policy management service 104 and are stored in a policy database. In an embodiment, the client application 102 transmits a request to the policy management service 104 using one or more application programming interface (API) calls to request creation of a principal 112 and attachment of one or more access control policies to the principal 112. The policies, in an embodiment, are used to establish, for one or more users of the customer account 110, a level of access to one or more resources 114 provisioned by or for the organization and, generally, access rights with respect to the one or more resources 114 provisioned by/for the organization. The organization, in an embodiment, is a user of a computing resource service provider that utilizes one or more services such as a virtual computer system service, object-based data storage services, database services, a policy management service and configuration and management service as well as a plurality of other services to create and manage resources 114 and to support operational needs.

A policy management service 104, in an embodiment, provides access to, and administration of, policies applicable to requests for access to computing resources (e.g., web service API requests). In an embodiment, the policy management service 104 receives information sufficient for selecting policies applicable to pending requests. In some embodiments, the information includes copies of the requests, or is information generated based at least in part on the requests. A service such as a service frontend (described herein) receives a request for access to resources 114 and generates a query to the policy management service 104 based at least in part on information specified by the request. The policy management service 104, in an embodiment, is one of a plurality of services provided by a computing resource service provider. In some embodiments, the policy management service 104 is a distributed computer system configured to centrally manage policies for multiple services operated by the computing resource service provider. Requests for access to service resources 114 (i.e., requests whose fulfillment involves access to the resources 114 themselves and/or information about the resources 114) are evaluated against one or more policies associated with the request and/or associated with the requester and those requests that are allowable based on those policies are performed. API calls to create, edit, and/or delete policies are also received by the policy management service 104. As policies change, so too does the scope of requests that are allowable change. In an embodiment, an organization has a default policy allowing reads from all storage resources of a certain class. Barring a specific policy restricting a certain user from performing such reads, the default policy would permit such reads by any user. A change to a default policy preventing all reads from that class of storage resource prevents that certain user from reading from such resources, and requires that specific permissions be granted if that user required that access. Granting such permissions requires that the policy be edited to change the permissions.

In an embodiment, in response to the request from the client application 102 to create a new principal 112 within the user account 110 and to associate one or more access control policies to this new principal 112, the policy management service 104 parses the request to identify the name of the requested principal 112, the requested policies that are to be associated with the principal 112, and identifying information about the client application 102 and the physical host making the request. This identifying information includes, but is not limited to, the Internet Protocol (IP) address of the physical host, the name of the client application 102, contact information for a user of the client application 102, and the like. In an embodiment, the policy management service 104 generates an activation code 106 that is usable by an administrator of the account 110 or other authenticating entity 108 to evaluate the policies to be associated with the principal 112 and determine whether to approve the client application 102 request to generate the new principal 112, associate the policies to this new principal 112, and enable the client application 102 to access, via assumption of the role of the principal 112, the one or more resources 114. In an embodiment, the activation code 106 is a Quick Response (QR) code that encodes a Uniform Resource Identifier (URI) for an interface of the policy management service 104 and information usable to identify a record that specifies the information provided in the client application 102 request. In an embodiment, the activation code 106 is an alphanumeric string of characters that correspond to the record that specifies the information. In an embodiment, the activation code 106 is a string of characters that includes a combination of alphanumeric and non-alphanumeric characters. In an embodiment, the activation code 106 is any optical, machine-readable, representation of data that encodes the URI, and/or other information usable to identify the record, for the interface. In an embodiment, the activation code 106 is human-readable.

In an embodiment, the policy management service 104 transmits an activation URI and the activation code 106 to the client application 102 to enable the client application 102 to provide the activation code 106 to an authenticating entity 108. In an alternative embodiment, the policy management service 104 evaluates the account 110 to identify an authenticating entity 108 that is authorized to associate policies with principals of the account 110. The policy management service 104, in this alternative embodiment, transmits the activation URI and the activation code 106 to the authenticating entity 108. The activation URI, if utilized, directs a user to an interface of the policy management service 104. The authenticating entity 108, in an embodiment, is an administrator of the account 110. This authenticating entity 108 manages and owns one or more resources 114 made available to users of the account 110. Further, the authenticating entity 108 has privileges for modifying permissions and/or for modifying a set of policies. In an embodiment, the administrator communicates with the policy management service 104 using one or more API calls to request creation of policies, editing of policies, or deletion of policies. Such policy modification activities (e.g., creating and editing) are also referred to herein as "authoring" a policy.

The authenticating entity 108, in an embodiment, upon receiving the activation URI and the activation code uses the activation URI to access an interface of the policy management service 104. Through the interface, the policy management service 104 prompts the authenticating entity 108 to submit credential information for authentication. The policy management service 104 evaluates the credential information of the authenticating entity 108 to determine whether the authenticating entity 108 is authenticated. In an embodiment, the policy management service 104 provides the credential information to an authentication service, which maintains a user profile for the authenticating entity 108, which specifies other information usable to verify the provided authentication information. If the policy management service 104 determines that the authenticating entity 108 has been authenticated, the policy management service 104 updates the interface to present an activation page. This activation page, in an embodiment, is a web page that enables the authenticating entity 108 to submit an activation code, such as activation code 106. In an embodiment, the interface enables the activating entity 108 to utilize one or more peripheral devices of a computing device utilized by the activating entity 108 to submit the activation code 106. Such peripheral devices include, but are not limited to, microphones, cameras, infrared scanners, optical scanners, and the like. Alternatively, in an embodiment, the authenticating entity 108 provides the activation code 106 via an API call to the policy management service 104.

In an embodiment, if the authenticating entity 108 provides the activation code 106 via the interface, the policy management service 104 determines whether the activation code 106 is valid. In an embodiment, the activation code 106 is subject to one or more expiration conditions whereby if an expiration condition is satisfied, the activation code 106 is rendered invalid. In an embodiment, an expiration condition is an expiration time. If the expiration time has elapsed, the policy management service 104 determines that the activation code 106 is no longer valid. In an embodiment, an expiration condition specifies that the activation code 106 is expired in response to receiving information indicating that the client application 102 has been compromised. In yet an embodiment, an expiration condition is satisfied if an authenticating entity 108 does not provide the activation code 106 within a pre-defined period of time after creation of the activation code 106. These one or more expiration conditions are maintained within the record maintained by the policy management service 104 corresponding to the request from the client application 102.

In an embodiment, if an expiration condition has been met, the activation code 106 is removed from the record. Thus, if the authenticating entity 108 provides an expired activation code, the policy management service 104, performing a lookup on the various stored records, will be unable to identify a record corresponding to the expired activation code. In an alternative embodiment, if the activation code 106 is expired, the policy management service 104 updates the corresponding record to indicate that the activation code 106 is not valid. Thus, if the authenticating entity 108 provides an expired activation code, the policy management service 104 determines, based at least in part on the corresponding record, that the activation code has expired and denies the request from the client application 102.

If the provided activation code 106 from the authenticating entity 108 is valid, the policy management service 104 updates the interface to provide a preview of the access control policies that will be associated to the principal 112 requested by the client application 102. The authenticating entity 108 reviews the access control policies specified through the interface, as well as the target one or more resources 114 subject to these access control policies and the identifying information of the client application 102, to determine whether to grant the request to create the new principal 112 and to associate these access control policies to the new principal 112. In an embodiment, if the authenticating entity 108 denies permission to grant the request, the policy management service 104 transmits a notification to the client application 102 indicating that its request has been denied. Additionally, in an embodiment, the policy management service 104 adds the client application 102 to a blacklist such that similar requests submitted by the client application 102 are automatically rejected and denied. Thus, the client application 102, by virtue of being listed in the blacklist, is prohibited from submitting requests to create new principals and to have access control policies associated with these new principals.

In an embodiment, if the authenticating entity 108 approves the request from the client application 102, the policy management service 104 generates the principal 112 within the account 110 and associates the one or more access control policies with the principal 112. Additionally, the policy management service 104 removes the record in order to prevent other entities from using the activation code 106. Thus, after creation of the principal 112, if another entity provides the activation code 106, the policy management service 104 indicates that the activation code 106 is no longer valid.

The client application 102, in an embodiment, polls the policy management service 104 and the service it is attempting to access with the activation code 106. If the principal 112 has been created and the applicable policies have been associated with the principal 112, the policy management service 104 transmits a successful response to the client application 102 and provides an access key identifier and a secret access key. The secret access key, in an embodiment, is shared between the principal 112 (e.g., the client application 102) and an authentication service of the service provider to verify digital signatures of requests purported to have been generated by the principal 112. The client application 102 installs this key onto its physical host to enable creation of requests to the service that can be authenticated by the service via the authentication service.

Figure 2:
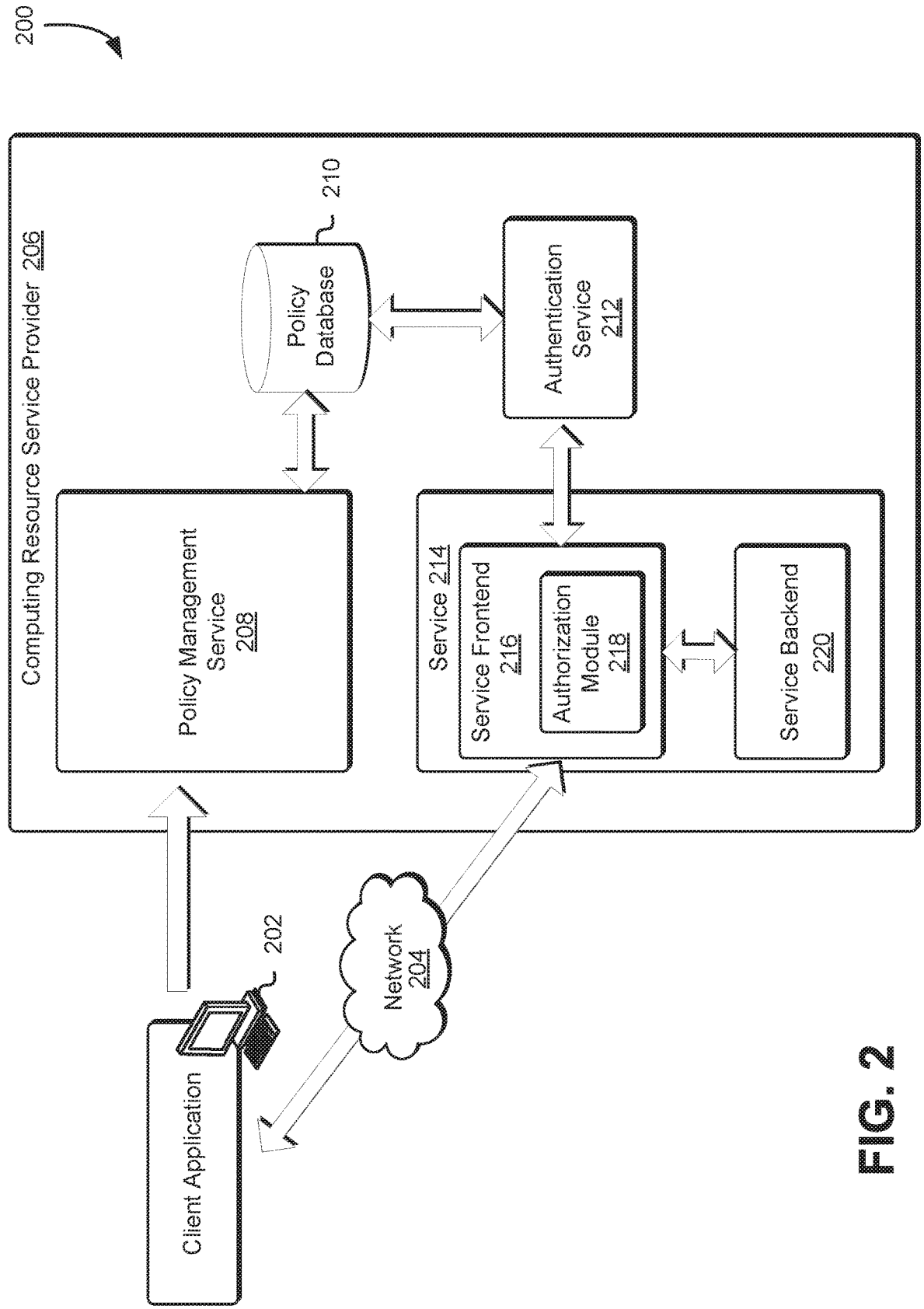
FIG. 2 shows an illustrative example of a system in which a principal associated with a client application is attached to one or more policies to enable access to resources of a service in accordance with an embodiment.

FIG. 2 shows an illustrative example of a system 200 in which a principal associated with a client application 202 is attached to one or more policies to enable access to resources of a service 214 in accordance with an embodiment. In the system 200, a client application 202 submits a request to a policy management service 208 to generate a principal and associate, with the principal, one or more access control policies for accessing one or more resources provided by a service 214. The request specifies a proposed name for the principal, a list of requested access control policies to be associated with the principal, and identifying information about the client application 202 and the physical host on which the client application 202 is installed. In an embodiment, the policy management service 208 stores a record for the request. This record includes an activation code generated in response to the request, the identifying information for the client application 202 and its physical host, the proposed principal name, and the applicable access control policies specified in the request. The policy management service 208 provides an activation code and a URI for an interface through which an authenticating entity can submit the activation code in order to review the request from the client application 202.

In an embodiment, an authenticating entity uses the provide URI to access the interface of the policy management service 208 and provides its credential information for authentication. The policy management service 208 transmits the credential information and other identifying information of the authenticating entity to an authentication service 212. The authentication service 212, in an embodiment, is a computer system configured to perform operations involved in authentication of principals and other entities associated with the computing resource service provider 206. The authentication service 212 is a stand-alone service or is part of a service provider or other entity. If the authentication service 212 provides an authentication response indicating that the authenticating entity has been authenticated, the policy management service 208 updates the interface to enable the authenticating entity to provide the activation code.

In response to receiving the activation code from the authenticating entity, the policy management service 208 determines whether the activation code is valid. In an embodiment, the policy management service 208 identifies, using the activation code, the record that specifies the information specified in the request from the client application 202. If the activation code is expired, the policy management service 208 rejects the request from the client application 202. However, if the activation code is valid, the policy management service 208 updates the interface to provide the authenticating entity with a preview of the policies that are to be associated with the principal requested by the client application. The policy management service 208 also, in an embodiment, enables the authenticating entity to approve the request from the client application 202.

If the authenticating entity approves the request from the client application 202, the policy management service 208 creates the new principal for the client application 202 and associated the specified access control policies with the new principal. Once the new principal has been created, the client application 202 uses a computing device to communicate over a network 204 with a computing resource service provider 206. Communications between the computing resource service provider 206 and the client application 202 are, for instance, for the purpose of accessing a service 214 operated by the computing resource service provider 206, which is one of many services operated by the computing resource service provider 206. The service 208, in an embodiment, comprises a service frontend 216 and a service backend 220. The client application 202 issues a request for access to a service 214 (and/or a request for access to resources associated with the service 214) provided by a computing resource service provider 206. The request is, in an embodiment, a web service API request. As noted above, the client application 202 assumes the role of the principal created in response to its request to the policy management service 208. The principal has a corresponding user definition, group definition, role definition, or other definition that defines the attributes and/or membership of that collection. In an embodiment, a group is a group of principals that have the same geographical location. The definition of that group of principals includes the membership of the group, the location, and other data and/or metadata associated with that group. As used herein, a principal is an entity corresponding to an identity managed by the computing resource service provider, where the computing resource service provider manages permissions for the identity and where the entity includes one or more sub-entities, which themselves have identities.

The client application 202 communicates with the computing resource service provider 206 via one or more connections (e.g., transmission control protocol (TCP) connections). The client application 202 is installed on any device that is capable of connecting with a computer system via a network, such as example devices discussed below. The network 204 includes, for example, the Internet or another network or combination of networks discussed below.

The computing resource service provider 206, through the service 214, provides, in an embodiment, access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Resources include, but are not limited to user resources, policy resources, network resources and/or storage resources. In an embodiment, the resources associated with the computer services are physical devices, virtual devices, combinations of physical and/or virtual devices, and the like.

The request for access to the service 214, in an embodiment, is received by a service frontend 216, which comprises a web server configured to receive such requests and to process them according to one or more policies associated with the service 214. The request for access to the service 214, in an embodiment, is a digitally signed request and, as a result, is provided with a digital signature. The service frontend 216 transmits the request and the digital signature for verification to the authentication service 212. In some embodiments, requests submitted to the service frontend 216 are digitally signed by the principal (i.e., the client application 202) using a symmetric cryptographic key that is shared between the principal and the authentication service 212. In an embodiment, the symmetric cryptographic key is provided to the client application 202 as a result of the authenticating entity approving the client application request to create a principal for accessing the service 214. The authentication service 212, in an embodiment, uses a copy of the symmetric cryptographic key to verify digital signatures of requests purported to have been generated by the principal. However, in an embodiment, the authentication service 212 is configured to utilize asymmetric cryptography for digital signature verification such as in response to the principal digitally signing requests using a private cryptographic key. In such embodiments, the authentication service is configured to trust a certificate authority that digitally signed a certificate of the principal corresponding to the private cryptographic key. Consequently, in some embodiments, the authentication service 212 uses a public cryptographic key specified by the certificate.

Upon successful authentication of a request, in an embodiment, the authentication service 212 obtains the policies applicable to the request. A policy is applicable to the request by way of being associated with the principal, a resource to be accessed as part of fulfillment of the request, a group in which the principal is a member, a role the principal has assumed, and/or otherwise. To obtain policies applicable to the request, the authentication service 212 transmits a query to a policy database 210 managed by the policy management service 208. The query to the policy database 210, in an embodiment, is a request comprising information sufficient to determine a set of policies applicable to the request. The query to the policy database contains, in an embodiment, a copy of the request and/or contains parameters based at least in part on information in the request, such as information identifying the principal, the resource, and/or an action (operation to be performed as part of fulfillment of the request). The policy database 210 is a database or other system operable to process queries. The policy database 210 processes queries by providing records and/or other such data applicable to the request and/or responsive to the queries. Note that, if authentication of the request is unsuccessful (e.g., because a digital signature could not be verified), policies applicable to the request and/or usage data associated with the policy are not provided to the requester.

Having obtained any policies applicable to the request, the authentication service 212, in an embodiment, provides an authentication response and, if applicable, the obtained policies back to the service frontend 216. The authentication response indicates whether the response was successfully authenticated. The service frontend 216 then checks whether the fulfillment of the request for access to the service 214 would comply with the obtained policies using an authorization module 218. An authorization module 218 is a process executing on the service frontend 216 that is operable to compare the request to the one or more permissions in the policy to determine whether service 214 can satisfy the request (i.e., whether fulfillment of the request is authorized). In an embodiment, the authorization module compares an API call associated with the request against permitted API calls specified by the policy to determine if the request is allowed. If the authorization module 218 is not able to match the request to a permission specified by the policy, the authorization module 218 executes one or more default actions such as providing a message to the service frontend 216 that causes the service frontend 216 to deny the request, and causing the denied request to be logged in the policy management service 208. If the authorization matches the request to one or more permissions specified by the policy, the authorization module 218 resolves this by selecting the least restrictive response (as defined by the policy) and by informing the service frontend 216 whether the fulfillment of the request is authorized (i.e., complies with applicable policy) based at least in part on that selected response. The authorization module 218, in an embodiment, can select the most restrictive response or can select some other such response and inform the service frontend 216 whether the fulfillment of the request is authorized based on that selected response. Note that, while FIG. 2 shows the authorization module 218 as a component of the service frontend 216, in some embodiments, the authorization module 218 is a separate service provided by the computing resource service provider 206 and the service frontend 216 communicates with the authorization module 218 over a network.

In an embodiment, if the fulfillment of the request for access to the service 214 complies with the applicable obtained policies, the service frontend 216 fulfills the request using the service backend 220. A service backend 220 is a component of the service 214 configured to receive authorized requests from the service frontend 216 and configured to fulfill such requests. The service frontend 216, in an embodiment, submits a request to the service backend 220 to cause the service backend 220 to perform one or more operations involved in fulfilling the request. In some embodiments, the service backend 220 provides data back to the service frontend 216 that the service frontend 216 provides in response to the request from the principal. In some embodiments, a response to the principal is provided from the service frontend 216 indicating whether the request was allowed or denied and, if allowed, one or more results of the request. In an embodiment, a result is an indication that the request was denied due to the principal not having the requisite authorization to access the service 214, as defined in the one or more policies. Alternatively, in an embodiment, a result is enabling the principal to access the service 214 in accordance with the one or more applicable policies.

Figure 3:
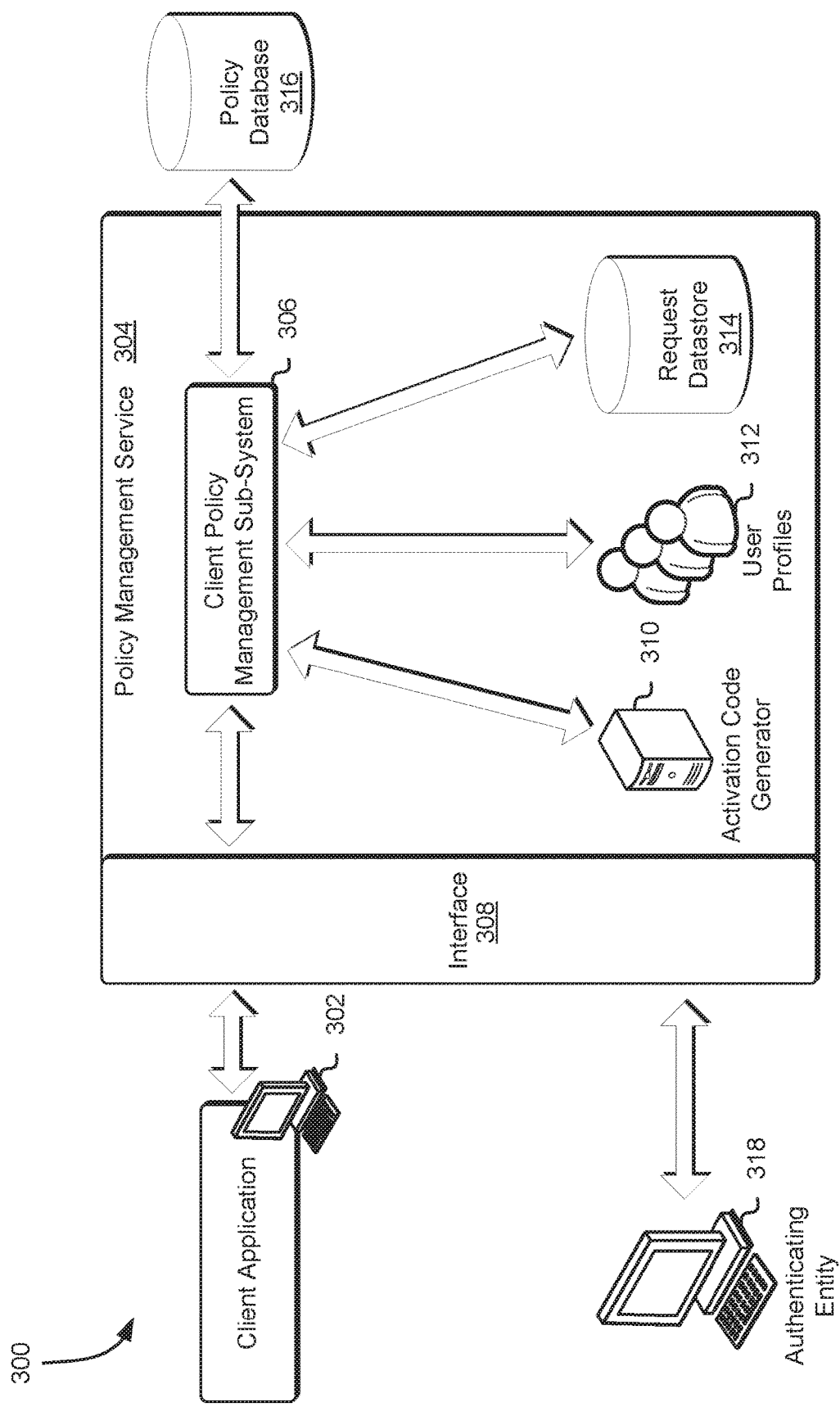
FIG. 3 shows an illustrative example of a system in which an authenticating entity approves attachment of one or more policies to a principal associated with a client application in accordance with an embodiment.

FIG. 3 shows an illustrative example of a system 300 in which an authenticating entity 318 approves attachment of one or more policies to a principal associated with a client application 302 in accordance with an embodiment. In the system 300, a client application 302 submits a request, via an interface 308, to a policy management service 304 request to generate a principal and associate one or more access control policies to the principal. This principal is usable by the client application 302 to access a service and utilize one or more resources of the service subject to the associated one or more access control policies. The request from the client application 302 specifies the name of the principal to be generated, that policies that are to be attached to the principal, and additional identifying information about the client application 302 and a physical host on which the client application 302 is installed. The interface 308, in an embodiment, is a web-based server that receives API requests from the client application 302 and other entities.

In an embodiment, the interface 308 transmits the request to a client policy management sub-system 306 for processing. The client policy management sub-system 306 comprises one or more computer systems of the policy management service 304 that process requests for principal generation and attachment of access control policies from a policy database 316 to newly generated principals. In response to the request from the client application 302, the client policy management sub-system 306 parses the request to obtain identifying information for the client application 302. This identifying information includes, but is not limited to, the IP address of a physical host on which the client application 302 is installed, the name of the client application 302, contact information for a user of the client application 302, and the like. The request, in an embodiment, specifies identifying information for an account in which the principal is to be added. The client policy management sub-system 306, in an embodiment, accesses a user profile repository 312 to identify the account specified in the request. This account specifies identifiers for one or more authenticating entities 318 that are authorized to authenticate requests from the client application 302 or from other entities attempting to generate a principal within the account and utilize this principal to access resources associated with the account.

The client policy management sub-system 306, in an embodiment, transmits a request to an activation code generator 310 to generate an activation code usable by an authenticating entity 318 to access the interface 308 and approve the request from the client application 302. The activation code generator 310, in an embodiment, comprises one or more computing systems that generate activation codes that are usable by the policy management service 304 to identify a corresponding record. Alternatively, in an embodiment, the activation code generator 310 is a distinct service or application that generates the activation codes. In an embodiment, the client policy management sub-system 306 generates a record within a request datastore 314 corresponding to the request from the client application 302. In the record, the client policy managed sub-system 306 records the identifying information from the client application 302, as well as account information from the user profiles datastore 312 and identifying information for the policies specified in the request and obtained from the policy database 316. In an embodiment, the client policy managed sub-system 306 provides an identifier for the record to the activation code generator 310, which encodes this identifier into the activation code.

The activation code generator 310, in an embodiment, provides the client policy management sub-system 306 with the activation code, which the client policy management sub-system 306 stores in the record. In an embodiment, the client policy management sub-system 306 transmits, via the interface 308, the activation code to an authenticating entity 318 identified in the account and/or to the client application 302. Additionally, the client policy management sub-system 306 generates and provides a URI to the authenticating entity 318 to enable the authenticating entity 318 to access the interface 308.

In an embodiment, the authenticating entity 318 utilizes the provided URI to access the interface 308. Through the interface 308, the authenticating entity 318 provides authentication information usable to authenticate the authenticating entity 318. The policy management service 304 provides this authentication information to an authentication service, such as authentication service 212 described above in connection with FIG. 2, for entity authentication. Based at least in part on a response from the authentication service, the policy management service 304 determines whether the authenticating entity has been authenticated. If so, the client policy management sub-system 306 updates the interface 308 to prompt the authenticating entity 318 to provide an activation code.

If the authenticating entity 318 provides an activation code via the interface 308, the client policy management sub-system 306 queries the request datastore 314 to identify a record that includes the provided activation code. If a record is not identified, the client policy management sub-system 306 rejects the activation code. However, if a record is identified, the client policy management sub-system 306 determines whether the activation code has expired by determining whether an expiration condition has been met. If an expiration condition has been met, the client policy management sub-system 306 removes the record from the request datastore 314 and transmits a notification to the client application 302 indicating that the request has been denied. However, if the activation code is not expired, the client policy management sub-system 306 updates the interface 308 to provide a preview of the access control policies specified in the record. These access control policies correspond to policies stored in the policy database 316. Through the interface 308, the authenticating entity 318 determines whether to approve the request from the client application 302. If the authenticating entity 318 approves the request, the client policy management sub-system 306 creates the principal in the account and attaches the access control policies to this principal. Further, in an embodiment, the client policy management sub-system 306 provides an access key (e.g., symmetric or asymmetric cryptographic key) to the client application 302. This access key is used to digitally sign requests to a service, which enables the service to authenticate the client application 302. The client policy management sub-system 306 updates the record to include the access key. Thus, while the activation code is active (e.g., not expired), the client application 302 can obtain the access key. Once the access key is provided to the client application 302, the client policy management sub-system 306 removes the record from the request datastore 314, rendering the activation code invalid.

In an embodiment, the client application 302 polls the client policy management sub-system 306 with the activation code. Once the record has been updated to include the access key, the client policy management sub-system 306 transmits a response to the client application 302 indicating that the request has been fulfilled. This response includes the access key, which the client application 302 installs on to its physical host. In an embodiment, the client policy management sub-system 306 allows polling retries for a limited time and then removes the record. This enables the client application 302 to submit requests to the client policy management sub-system 306 to obtain the access key. In an embodiment, these requests include the activation code provided to the client application 302. The client application 302 can poll the client policy management sub-system 306 periodically, aperiodically (e.g., in response to receiving input indicating that polling is to occur, in response to a triggering event, etc.), or in an ad hoc manner via push notifications. If the request from the client application 302 is denied by the authenticating entity 318, in an embodiment, the client policy management sub-system 306 updates the account to indicate that the client application 302 has been added to a blacklist. While the client application 302 is specified in the blacklist, requests from the client application 302 to create a new principal within the account are automatically denied by the client policy management sub-system 306. In an embodiment, in response to a request from the client application 302 to retrieve the access key, the client policy management sub-system 306 accesses the blacklist to determine whether the client application 302 is specified in the blacklist. If so, the request is denied. The client application 302, in an embodiment, is specified in the blacklist for a limited time (e.g., an hour, a day, a week, etc.). In an embodiment, an authenticating entity is authorized to remove a client application 302 specified in the blacklist at any time. The authenticating entity, in an embodiment, can add a client application 302 to the blacklist at any time, even without the client policy management sub-system 306 receiving requests from the client application 302 to create a new principal and associate access control policies to this principal.

Figure 4A:
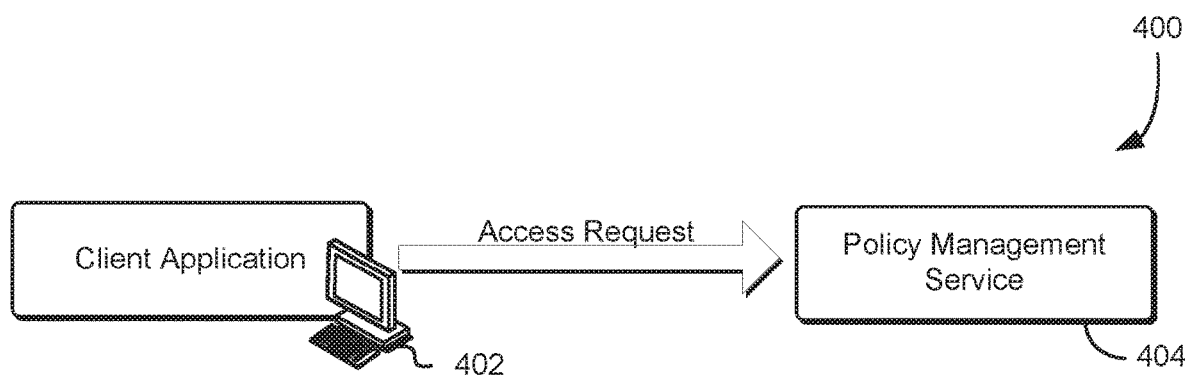
FIG. 4A shows an illustrative example of a system in which a client application submits an access request to a policy management service for creation of a principal usable to access another service in accordance with an embodiment.
Figure 4B:
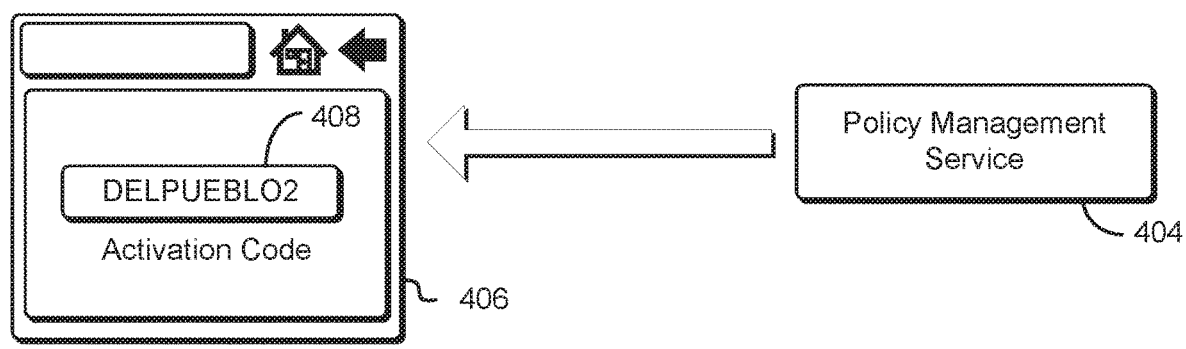
FIG. 4B shows an illustrative example of a system in which a policy management service transmits, in response to a request from a client application, an activation code usable by an authenticating entity to approve the request from the client application in accordance with an embodiment.

FIG. 4A shows an illustrative example of a system 400 wherein a client application 402 submits an access request to a policy management service 404 for creation of a principal usable to access another service in accordance with an embodiment. The request from the client application 402 specifies identifying information that includes, but is not limited to, the IP address of a physical host on which the client application 402 is installed, the name of the client application 402, contact information for a user of the client application 402, and the like. The request, in an embodiment, specifies identifying information for an account in which the principal is to be added. In response to the request, as illustrated in FIG. 4B, the policy management 404 provides an activation code 408 via an interface 406. In an embodiment, the interface 406 is web-based browser which provides a graphical user interface through which the activation code 408 is provided. The interface 406 is accessible by the client application 402 and an authenticating entity authorized to utilize the activation code to obtain a preview of the policies applicable to the request from the client application 402 to the policy management service 404. In an embodiment, the policy management service 404 provides a URI to the authenticating entity to enable the authenticating entity to access an interface for providing the activation code and approving the request from the client application 402. In an embodiment, the policy management service 404 enables the authenticating entity to access the policy management service 404 in an analogous manner, partially or entirely via programmatic interfaces, such as APIs. Thus, rather than providing a URI to the authenticating entity, the policy management service 404 exposes an API whereby the authenticating entity can utilize the exposed API to submit an API call that includes the authentication code 408.

Figure 4C:
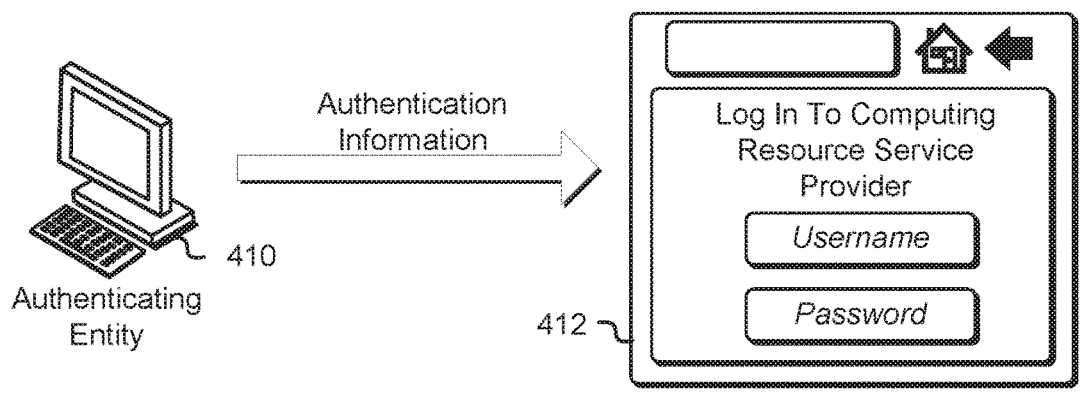
FIG. 4C shows an illustrative example of a system in which an authenticating entity provides authentication information to an interface of a policy management service to access a preview of the request submitted by a client application in accordance with an embodiment.

In an embodiment, as illustrated in FIG. 4C, the authenticating entity 410 utilizes the URI provided by the policy management service 404 to access an interface 412. Through the interface 412, the policy management service 404 prompts the authenticating entity 410 to provide authentication information usable by an authentication service to authenticate the authenticating entity 410. As illustrated in FIG. 4C, the interface 412 includes a username input field and a password input field, through which the authenticating entity 410 provides its authentication information (e.g., username and password). While usernames and passwords are used extensively throughout the present disclosure, other forms of authentication information can be provided by the authenticating entity 410. The interface 412 can prompt the authenticating entity 410 to provide authentication information comprising a recording of facial gestures, a recording of non-facial gestures, audial recordings, textual responses to challenges, and the like.

Figure 4D:
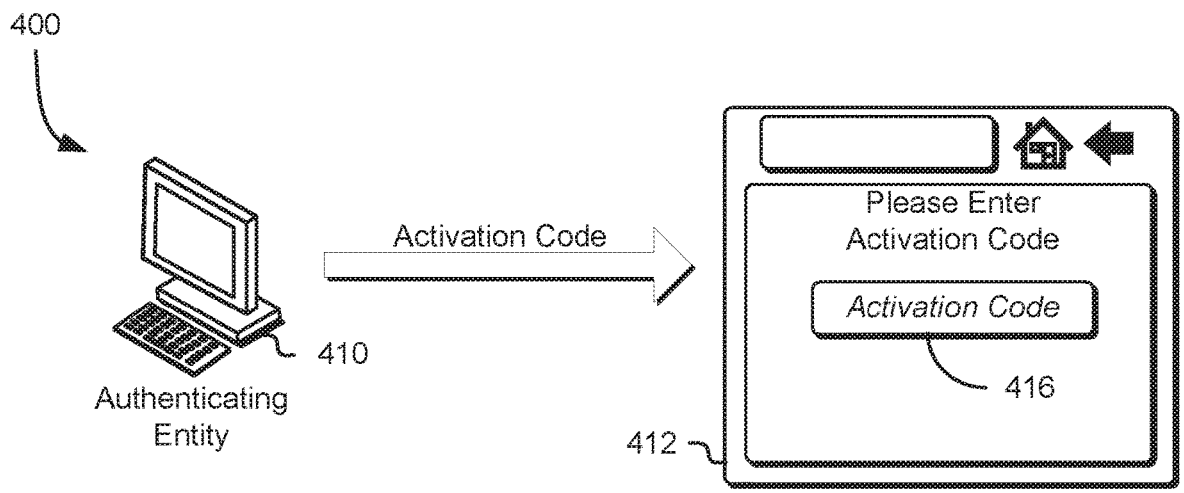
FIG. 4D shows an illustrative example of a system in which an interface is provided to enable an authenticating entity to provide an activation code to a policy management service in accordance with an embodiment.

If the authenticating entity 410 is authenticated, in an embodiment, the policy management service updates the interface 412 to enable the authenticating entity 410 to submit an activation code 408. As illustrated in FIG. 4D, the interface 412 is updated to enable the authenticating entity 410 to provide the activation code 408 via an activation code input field 416. In an embodiment, authenticating entity 410 provides its activation code 408 via the activation code input field 416 and, via the interface 412, submits the activation code 408. Alternatively, in an embodiment, the interface 412 enables the authenticating entity 410 to utilize one or more peripheral devices of a computing device to scan or otherwise provide the activation code 408.

Figure 4E:
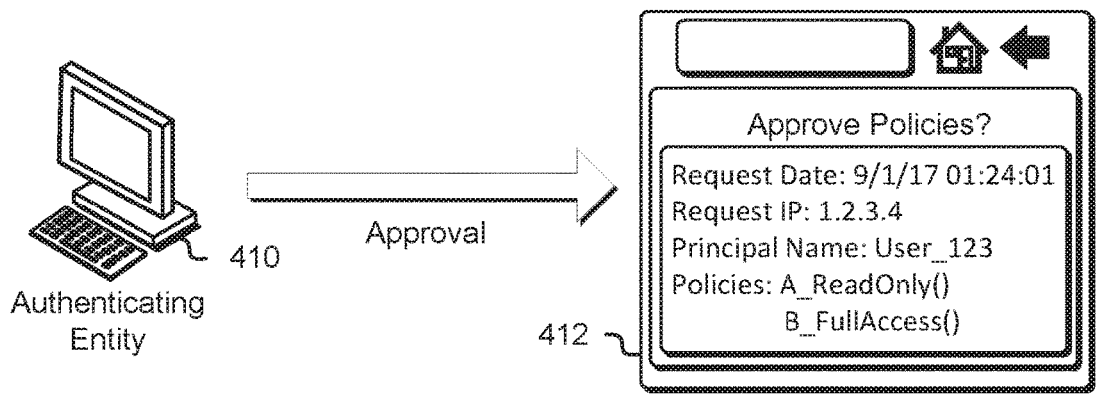
FIG. 4E shows an illustrative example of a system in which a preview of policies applicable to a principal requested by a client application is presented for approval in accordance with an embodiment.
Figure 4F:
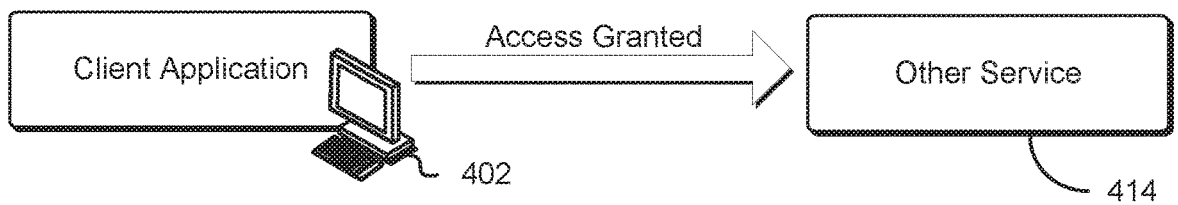
FIG. 4F shows an illustrative example of a system in which a client application is granted access to another service based at least in part on applicable policies in accordance with an embodiment.

The policy management service 404 evaluates the activation code to identify a record corresponding to the request submitted by the client application 402. As illustrated in FIG. 4E, the policy management service 404 updates the interface 412, based at least in part on information specified in the record, to provide the authenticating entity 410 with a preview of the principal that is to be created on behalf of the client application 402 and the one or more access control policies that are to be attached to the principal. Additionally, the policy management service 404 updates the interface 412 to specify identifying information of the client application 402 including, but not limited to, a date/time the request from the client application 402 was made, the IP address of the client application 402, and the like. Through the interface 412, the authenticating entity 410 reviews the request from the client application 402 and determines whether to approve the request. As illustrated in FIG. 4F, if the authenticating entity 410 approves the request, the client application 402 is granted access to the other service 414 subject to the policies attached to the principal.

Figure 5:
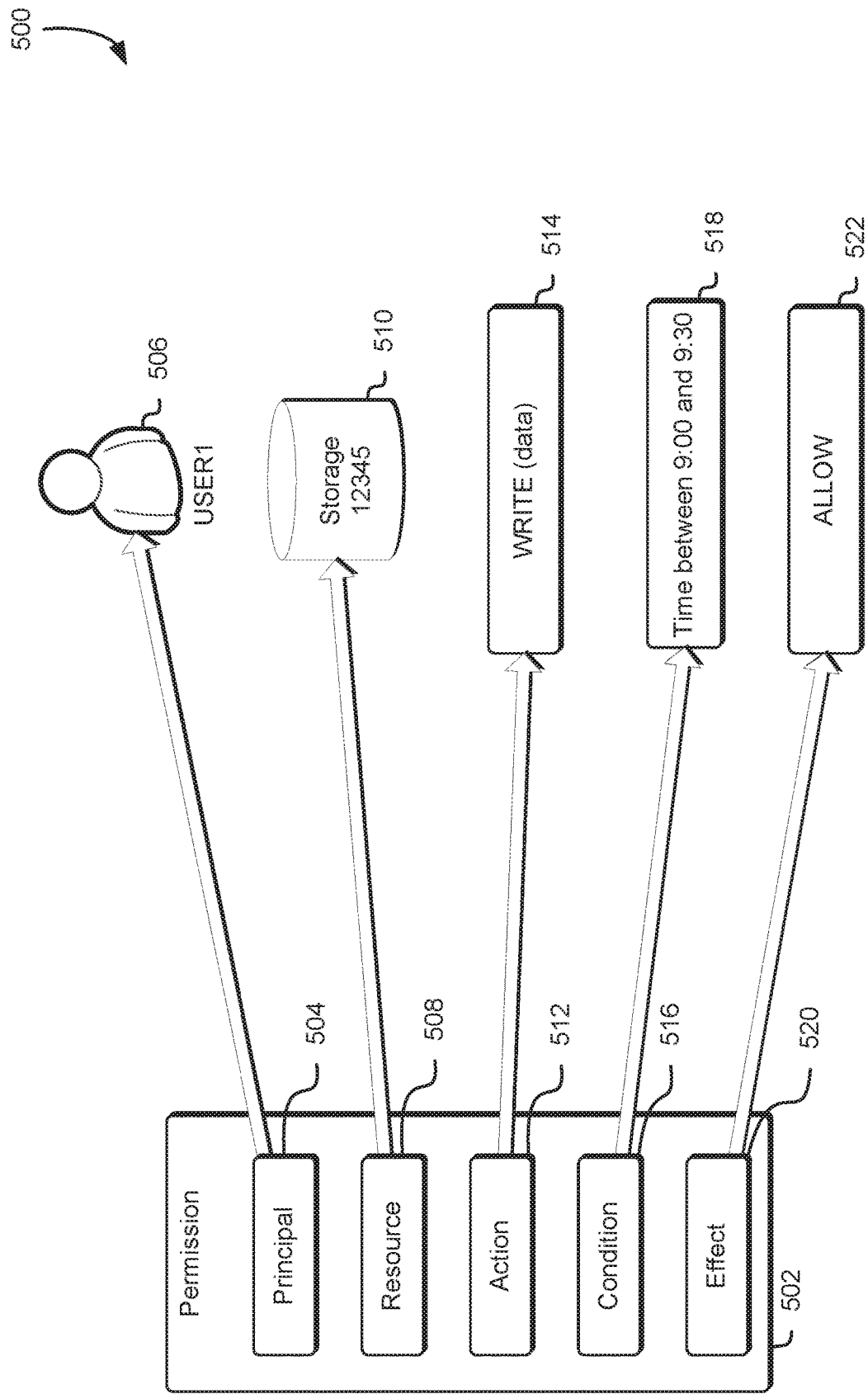
FIG. 5 shows an illustrative example of a diagram in which a permission associated with a computing resource policy is illustrated in accordance with an embodiment.

FIG. 5 shows an illustrative example of an example diagram 500 in which a permission associated with a computing resource policy is illustrated in accordance with an embodiment. In an embodiment, a permission 502 specifies a principal 504, a resource 508, an action 512, a condition 516, and an effect 520. In some embodiments, a permission 502 also specifies a plurality of one or more of these elements such as, for example, a set or class of users, a collection of resources, several different actions, and/or multiple conditions.

The principal 504, in an embodiment, is a user, a group, an organization, a role, or a collection and/or combination of these or other such entities. A principal 504 is any entity that is capable of submitting API calls that cause an action associated with a resource to be performed and/or any entity to which permissions associated with a resource are granted. In the permission 502 illustrated in FIG. 5, the principal 504 is a user 506 identified as "USER1." In an embodiment, the principal 504 is defined by a client application in its request to the policy management service to enable access to one or more services.

The action 512, in an embodiment, is any action that is performable in association with the resource and is identified by a type of API call, a library call, a program, process, series of steps, a workflow, or some other such action. In an embodiment, an action is a set of operations that are performable as part of the fulfillment of an API call to a web service. The actions that are performed comprise a subset of those actions and/or a single operation. The operations are also performable in a defined order, are repeatable, or are shared between a plurality of API calls. In the permission 502 illustrated in FIG. 5, the action is an API call to write data to the resource. The permission 502 illustrated in FIG. 5, in an embodiment, is one of a plurality of permissions specified by user policy permissions. The permission 502 illustrated in FIG. 5 further specifies a storage resource 510 for the resource 508, a data write API call 514 for the action 512, a time condition 518 for the condition 516, and an ALLOW effect 522 for the effect 520. The permission thus specifies that "USER1 is ALLOWED to WRITE to 12345 between 9:00 AND 9:30 AM."

Figure 6:
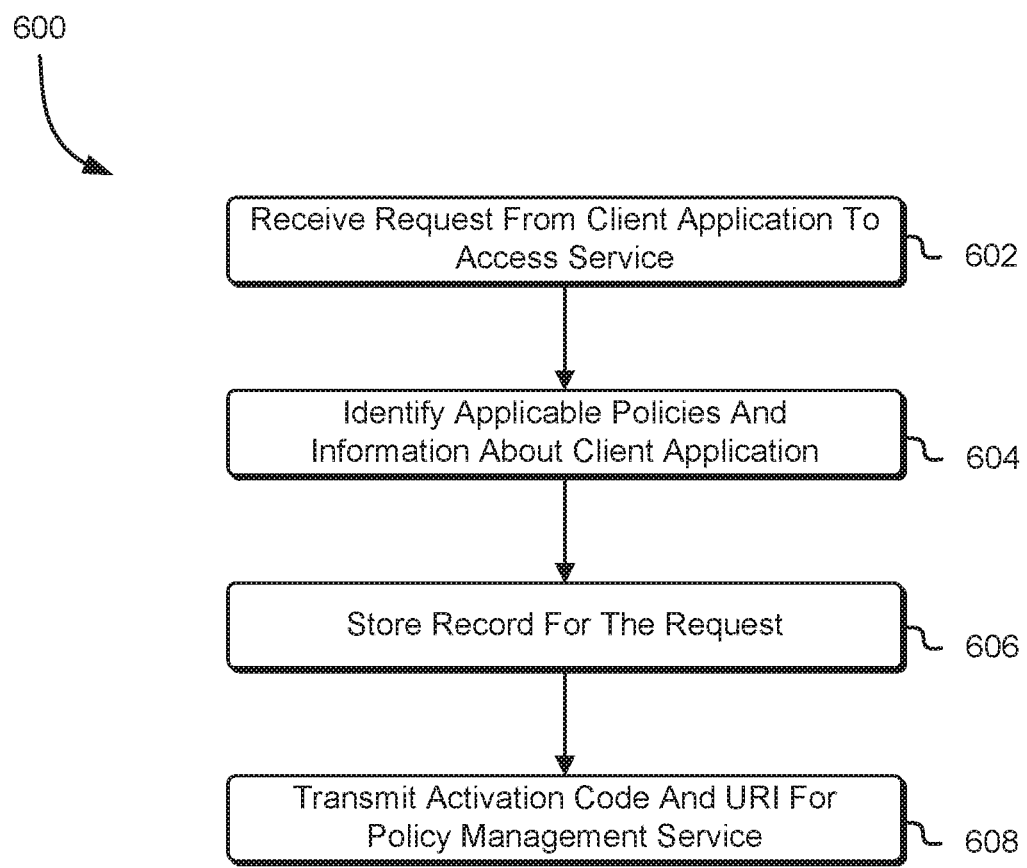
FIG. 6 shows an illustrative example of a process for transmitting an activation code for attachment of one or more policies to a principal associated with a client application in accordance with an embodiment.

FIG. 6 shows an illustrative example of a process 600 for transmitting an activation code for attachment of one or more policies to a principal associated with a client application in accordance with an embodiment. The process 600 is performed by a client policy management sub-system of a policy management service, which utilizes an interface to provide the activation code. In an embodiment, the client policy management sub-system receives 602, via an interface and from a client application, a request to access a service. The request, in an embodiment, specifies that a principal is to be created within an account and the particular resources to which the client application requires access. Based at least in part on this information specified within the request, the policy management service identifies 604 one or more applicable access control policies to be associated with the principal to enable the client application to access the one or more resources. In an embodiment, the request from the client application to the policy management service is unauthenticated (e.g., no credential information is supplied and no authentication is performed for the client application). The client policy management sub-system further identifies identifying information for the client application, including, but is not limited to, the IP address of a physical host on which the client application is installed, the name of the client application, contact information for a user of the client application, and the like.

The client policy management sub-system generates, in response to the request, a record that specifies the identifying information, the principal that is to be generated, and the access control policies that are to be associated with the principal upon approval by an authenticating entity. In an embodiment, the client policy management sub-system stores 606 the record for the request in a request datastore of the policy management service. The client policy management sub-system obtains an identifier corresponding to the record and submits a request to an activation code generator to generate an activation code for authentication of the request. In an embodiment, the client policy management sub-system provides the identifier for the record to the activation code generator to enable the activation code generator to encode the identifier into the activation code. The client policy management sub-system stores the activation code in the record.

In an embodiment, the client policy management sub-system transmits 608 the activation code and a URI corresponding to an interface of the policy management service to the client application. This enables the client application to provide the activation code and the URI to an authenticating entity to enable the administrator to access the interface and provide the activation code. Further, the client application uses the activation code to poll the policy management service and obtain an access key for accessing the requested service and resources once the request has been approved by an authenticating entity. In an embodiment, the client policy management sub-system transmits the activation code and URI to an authenticating entity specified in an account in which the principal is to be generated. The authenticating entity can use the URI to access the policy management service and provide the activation code to review the request submitted by the client application.

Figure 7:
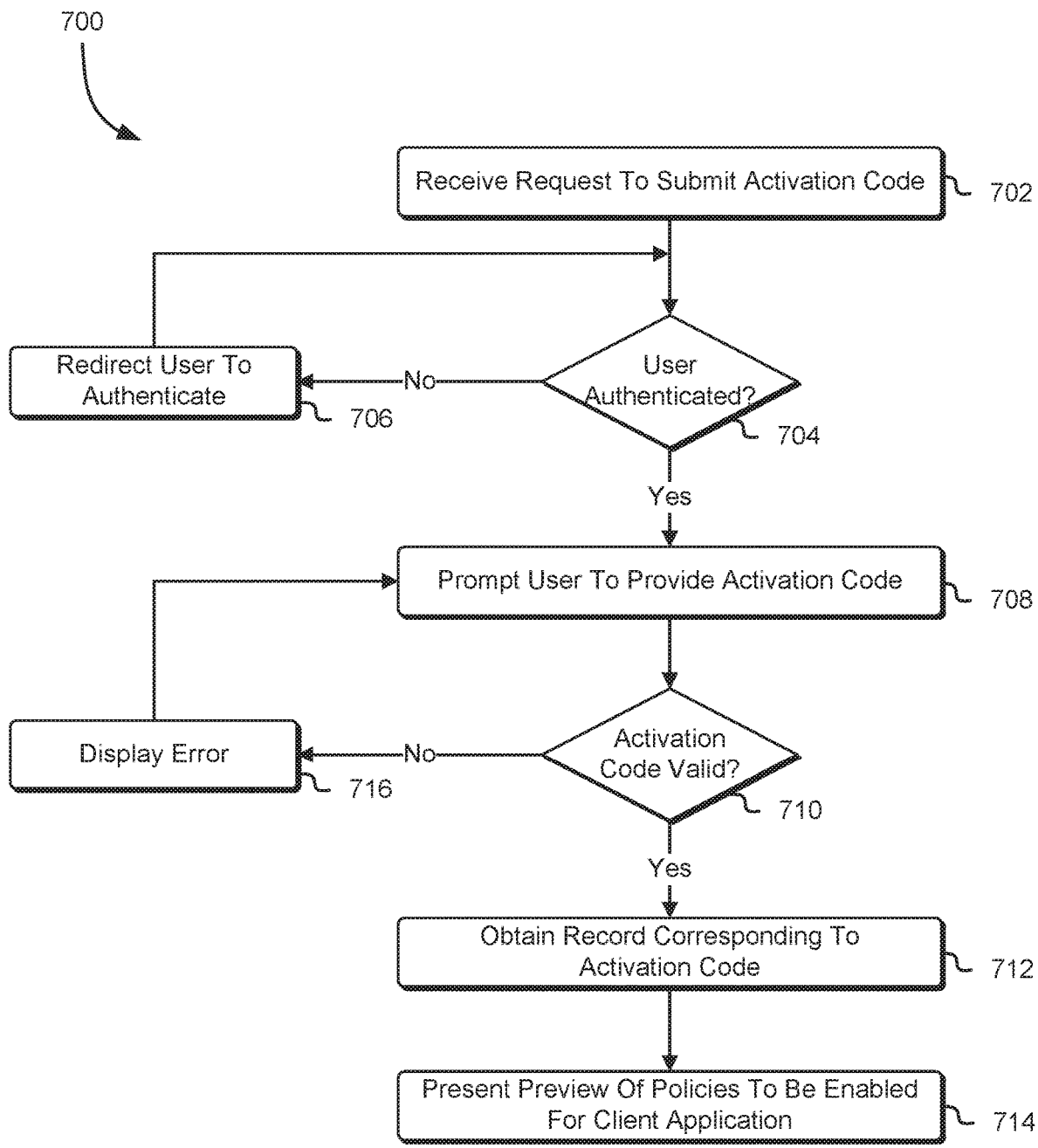
FIG. 7 shows an illustrative example of a process for presenting a preview of policies to be enabled for a client application in response to receiving an activation code in accordance with an embodiment.

FIG. 7 shows an illustrative example of a process 700 for presenting a preview of policies to be enabled for a client application in response to receiving an activation code in accordance with an embodiment. The process 700 is performed by a client policy management sub-system of a policy management service, which provides an interface to users to enable these users to provide an activation code usable for verifying the access control policies that are to be attached to a principal associated with a client application. In an embodiment, the client policy management sub-system receives 702, via an interface provided by the policy management service, a request to submit an activation code. The request, in an embodiment, is an authenticating entity, as described above, that upon receiving the activation URI and the activation code uses the activation URI to access the interface. Through the interface, the client policy management sub-system prompts the authenticating entity to submit credential information for authentication.

In an embodiment, the client policy management sub-system evaluates the credential information of the authenticating entity to determine 704 whether the authenticating entity is authenticated. In an embodiment, the client policy management sub-system provides the credential information to an authentication service, which maintains a user profile for the authenticating entity, which specifies other information usable to verify the provided authentication information. If the client policy management sub-system determines that the authenticating entity is not authenticated, the client policy management sub-system redirects 706 the user to authenticate with the client policy management sub-system or another service. However, if the authenticating entity has been authenticated, the client policy management sub-system updates the interface to present an activation page and to prompt 708 the authenticating entity to provide its activation code. This activation page, in an embodiment, is a web page that enables the authenticating entity to submit an activation code. In an embodiment, the interface enables the activating entity to utilize one or more peripheral devices of a computing device utilized by the activating entity to submit the activation code.

In an embodiment, if the authenticating entity provides the activation code via the interface, the client policy management sub-system determines 710 whether the activation code is valid. In an embodiment, the activation code is subject to one or more expiration conditions whereby if an expiration condition is satisfied, the activation code is rendered invalid. In an embodiment, the client policy management sub-system uses the provided the activation code to determine whether there is a corresponding record that includes the policies that are to be associated with a principal corresponding to a client application. If a record does not exist for the provided activation code, the client policy management sub-system determines that the activation code is invalid. If a record exists, the client policy management sub-system determines whether the record specifies one or more expiration conditions for the activation code. The client policy management sub-system evaluates these expiration conditions to determine whether any have been met. If so, the activation code is deemed invalid.

If the activation code is invalid, in an embodiment, the client policy management sub-system updates the interface to display 716 and error notification indicating that the activation code is invalid. In an embodiment, the client policy management sub-system prompts 708 the user to provide another activation code. Alternately, in an embodiment, the client policy management sub-system terminates the connection between the user and the policy management service if the activation code provided is invalid and the error has been displayed via the interface. However, if the activation code is valid and corresponds to an existing record, the client policy management sub-system obtains 712 this existing record and identifies the one or more policies that the client application has specified are to be associated with a principal for the client application. Through the interface, the client policy management sub-system presents 714 a preview of the policies that are to be enabled for the client application via association of these policies with a particular principal created by the client application. Through the interface, the authenticating entity evaluates these policies and determines whether to grant the request from the client application.

Figure 8:
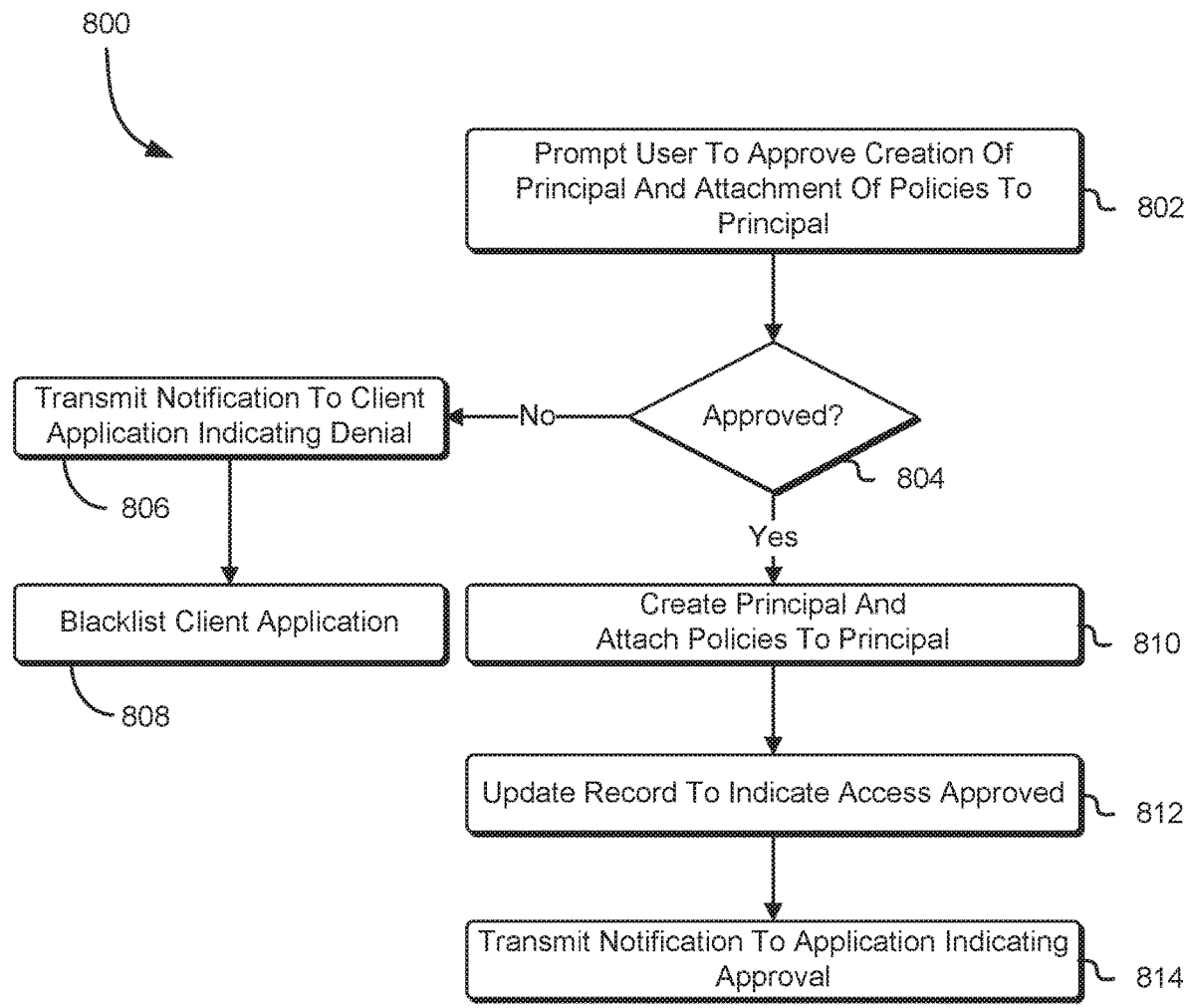
FIG. 8 shows an illustrative example of a process for creating a principal associated with a client application and attaching policies to the principal to enable the client application to access one or more service subject to the policies in accordance with an embodiment.

FIG. 8 shows an illustrative example of a process 800 for creating a principal associated with a client application and attaching policies to the principal to enable the client application to access one or more service subject to the policies in accordance with an embodiment. The process 800 is performed by the aforementioned client policy management sub-system of the policy management service. As noted above, if the authenticating entity is successfully authenticated, the client policy management sub-system updates the interface to prompt the authenticating entity to provide its activation code. Using the provided activation code, the client policy management sub-system identifies a record that specifies the principal requested by a client application and the one or more access control policies that are to be associated with this principal. In an embodiment, the client policy management sub-system updates the interface to provide the authenticating entity with a preview of the one or more policies that are to be associated with the principal created by the client application. Further, the client policy management sub-system prompts 802 the authenticating entity (e.g., user) to approve creation of the principal and attachment of this principal to the one or more policies identified in the record.

In an embodiment, the authenticating entity uses the interface to either approve or reject the creation of the principal and/or attachment of the one or more policies to the principal. Based at least in part on the response from the authenticating entity, the client policy management sub-system determines 804 whether the client application request has been approved. In an embodiment, if the authenticating entity specifies that the client application request is rejected, the client policy management sub-system transmits 806 a notification to the client application to indicate that its request has been denied. Additionally, in an embodiment, the client policy management sub-system blacklists 808 the client application. The client policy management sub-system updates a profile corresponding to the client application to specify that the client application has been blacklisted. Further, the client policy management sub-system updates a database corresponding to blacklisted entities to specify an identifier of the client application. Thus, the client application, by virtue of being listed in the blacklist, is prohibited from submitting requests to create new principals and to have access control policies associated with these new principals.

In an embodiment, if the authenticating entity approves the client application request to create a new principal and attach one or more policies to this principal, the client policy management sub-system creates 810 a new principal using the attributes specified by the client application and attaches the one or more policies to this new principal. In an embodiment, the client policy management sub-system generates one or more permissions associated with these policies to indicate the access controls applicable to the principal and adds these permissions to a policy database. Thus, requests made by the client application corresponding to the newly created principal cause the policy management service to identify the permissions corresponding to the principal and the associated policies. In an embodiment, the client policy management sub-system updates 812 the record corresponding to the request from the client application to indicate that access has been approved subject to the one or more access control policies. In an embodiment, the client policy management sub-system updates the record to include an access key. This access key is used to digitally sign requests to a service, which enables the service to authenticate the client application. In an embodiment, while the activation code is active (e.g., not expired), the client application can obtain the access key. Once the access key is provided to the client application, the client policy management sub-system removes the record from the request datastore, rendering the activation code invalid.

The client policy management sub-system, in an embodiment, transmits 814 a notification to the client application to indicate that its request has been fulfilled. This notification includes the access key, which the client application installs on to its physical host. In an embodiment, the client application polls the client policy management sub-system with the activation code to obtain the access key. Thus, if the record includes the access key, the client policy management sub-system transmits the notification with the access key in response to a poll. In an embodiment, the client policy management sub-system allows polling retries for a limited time and then removes the record. Further, as described above, if the polling is successful, the record is removed to prevent further use of the activation code to obtain the access key.

Figure 9:
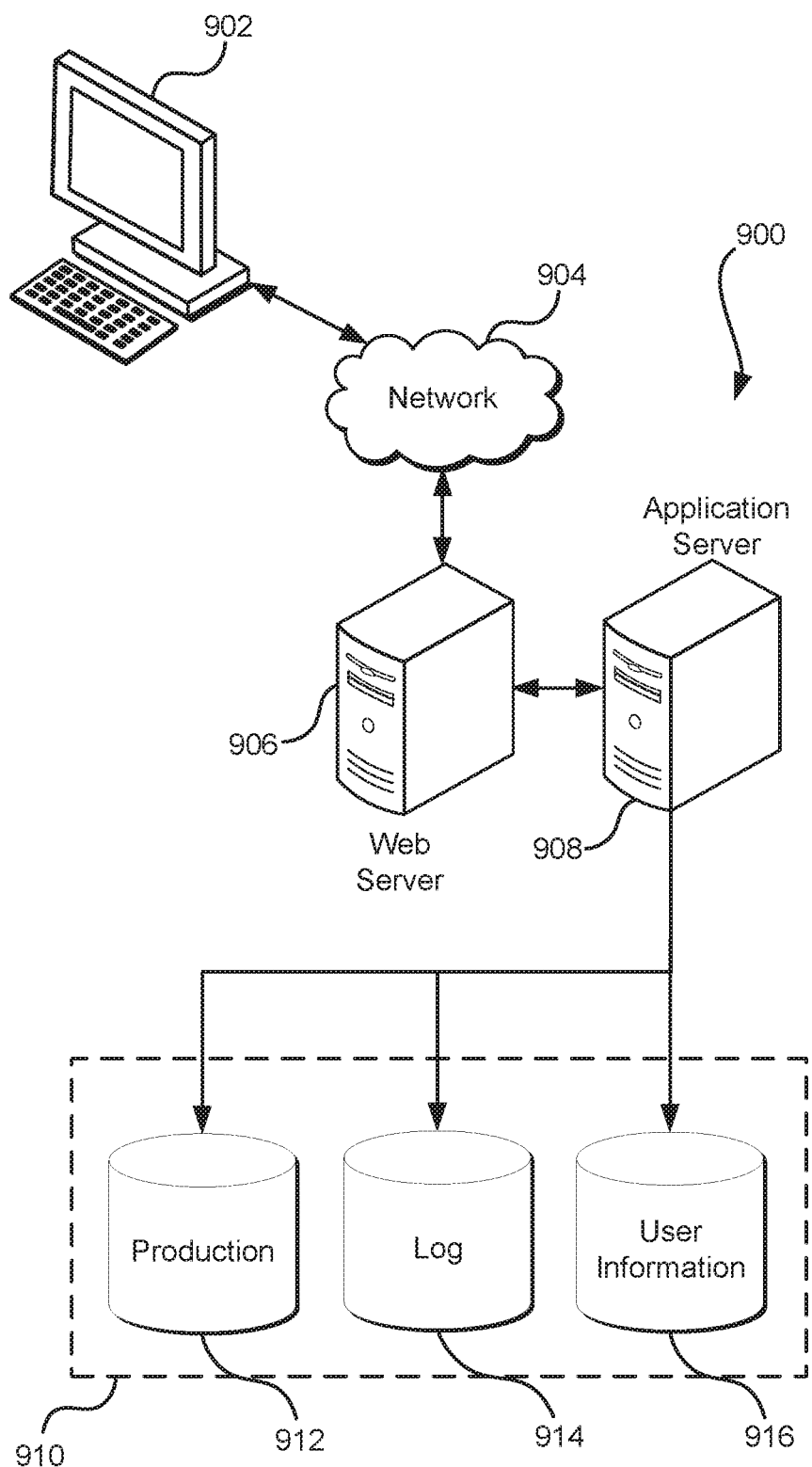
FIG. 9 illustrates a system in which various embodiments can be implemented.

FIG. 9 illustrates aspects of an example system 900 for implementing aspects in accordance with various embodiments. As will be appreciated, although a web-based system is used for purposes of explanation, different systems may be used, as appropriate, to implement various embodiments. The system includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

The illustrative system includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating systems, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining a request by a first application to access a first service, the request including information specifying an account associated with resources provided by the first service;
without authenticating the request:
identifying, based at least in part on the information specified in the request, an access control policy granting access; and
providing an activation code to a second application, the activation code usable to make activation information associated with the access control policy available to the second application;
as a result of a validation of the activation code by the second application, providing a preview of the access control policy that will be associated with the account;
as a result of an approval of the preview and a determination by the second application that the access by the first application is authorized, creating, at a second service, a user profile associated with the access control policy and the account; and
updating the first service to provide the access based at least in part on the user profile.

2. The computer-implemented method of claim 1, wherein the request further specifies an identity of the user profile and the access control policy.

3. The computer-implemented method of claim 1, further comprising:
obtaining the activation information and authentication information of the second application;
utilizing the activation information to identify a record specifying the user profile and the access control policy; and
updating an interface to present the record permitting the second application to determine whether the access is authorized.

4. The computer-implemented method of claim 1, further comprising transmitting an access key to the first application to cause the first application to access the first service assuming an identity of the user profile.

5. A system, comprising:
one or more processors; and
memory to store executable instructions that, if executed by the one or more processors, cause the system to:
obtain a request by an application to access a service, the request specifying at least an account associated with resources of the service and a policy that is to be attached to the account;
identify, based at least in part on the account and the policy specified in the request, an access control policy granting access to the service;
provide, to a second application, first information associated with the access control policy to cause a preview of the access control policy that is to be attached to the account;
as a result of an approval of the preview, cause generation of authorization information, the authorization information specifying whether the access by the application is authorized; creating, at the second application, a user profile associated with the access control policy and the account; and
update the service with the authorization information.

6. The system of claim 5, wherein:
the request specifies creation of a principal to be associated with the access control policy; and
the executable instructions further cause the system to generate a record specifying the principal and the access control policy granting authorization of the request.

7. The system of claim 5, wherein the first information is an activation code usable to access a record specifying the request by the application and the access control policy.

8. The system of claim 7, wherein the activation code is a Quick Response code that causes a second application to access an interface for accessing the record.

9. The system of claim 5, wherein the executable instructions further cause the system to:
obtain a second request to submit the first information; and
in response to the second request, cause an interface to obtain the first information and authentication information usable to determine whether to fulfill the second request.

10. The system of claim 5, wherein:
the authorization information specifies that the request is authorized; and
the executable instructions further cause the system to delete the first information.

11. The system of claim 5, wherein:
the authorization information specifies that the request is approved; and
the executable instructions further cause the system to transmit a notification to the application to cause the application to access the service subject to the access control policy.

12. The system of claim 11, wherein the notification includes a cryptographic key usable by the application to submit digitally signed requests verifiable by the service using the authorization information.

13. A non-transitory computer-readable storage medium storing thereon executable instructions that, if executed by the one or more processors of a computer system, cause the computer system to at least:
obtain a request by an application to access a service, the request including first information specifying at least an account associated with resources provided via the service, the request lacking credential information;
identify, based at least in part on the first information, an access control policy specifying a set of permissions to be utilized to determine whether the access is authorized;
provide, to a second application, second information associated with the access control policy to obtain authorization information, the authorization information defining whether the access is authorized, the authorization information resulting in a preview of the access control policy; creating, at the second application, a user profile associated with the access control policy and the account; and
as a result of an approval of the preview, update the service with the authorization information to cause the service to determine whether the application is authorized to access the service.

14. The non-transitory computer-readable storage medium of claim 13, wherein the executable instructions further cause the computer system to:
insert the first information into a database; and
upon an indication that the request is authorized, delete the first information.

15. The non-transitory computer-readable storage medium of claim 13, wherein the executable instructions further cause the computer system to:
   obtain a second request to submit the second information; and
   in response to the second request, obtain the second information and authentication information to determine whether to fulfill the second request.

16. The non-transitory computer-readable storage medium of claim 13, wherein the second information is a code usable to access a record specifying the request and the access control policy.

17. The non-transitory computer-readable storage medium of claim 16, wherein the code is an optical representation of data that encodes a Uniform Resource Identifier of an interface that obtains the authorization information.

18. The non-transitory computer-readable storage medium of claim 13, wherein:
   the authorization information specifies that the request is approved; and
   the executable instructions further cause the computer system to permit the application to access the service subject to the access control policy.

19. The non-transitory computer-readable storage medium of claim 18, wherein the executable instructions further cause the computer system to transmit a notification to the application, the notification including a cryptographic key usable by the application to submit digitally signed requests verifiable by the service using the authorization information.

20. The non-transitory computer-readable storage medium of claim 13, wherein:
   the request specifies creation of a principal and an association between the principal and the access control policy; and
   the executable instructions further cause the computer system to generate a record specifying the principal and the access control policy to cause generation of the authorization information.

\* \* \* \* \*